US008763489B2

(12) United States Patent
Kirihara et al.

(10) Patent No.: US 8,763,489 B2
(45) Date of Patent: Jul. 1, 2014

(54) ROBOT

(75) Inventors: Daisuke Kirihara, Chino (JP); Shingo Hoshino, Hokuto (JP)

(73) Assignee: Seiko Epson Corporation (JP)

( * ) Notice: Subject to any disclaimer, the term of this patent is extended or adjusted under 35 U.S.C. 154(b) by 217 days.

(21) Appl. No.: 13/454,355

(22) Filed: Apr. 24, 2012

(65) Prior Publication Data
US 2012/0272774 A1 Nov. 1, 2012

(30) Foreign Application Priority Data

Apr. 28, 2011 (JP) ................................ 2011-100814

(51) Int. Cl.
| B25J 17/00 | (2006.01) |
| B25J 17/02 | (2006.01) |
| B25J 18/00 | (2006.01) |
| B25J 9/06 | (2006.01) |
| B25J 9/00 | (2006.01) |

(52) U.S. Cl.
CPC ...... *B25J 9/0087* (2013.01); *B25J 9/06* (2013.01); *B25J 9/0027* (2013.01); *B25J 18/005* (2013.01); *Y10S 901/15* (2013.01); *Y10S 901/28* (2013.01)
USPC .......... 74/490.01; 74/490.05; 901/15; 901/28

(58) Field of Classification Search
USPC ......... 74/490.01, 490.05, 490.06; 901/14, 15, 901/27, 28, 29
See application file for complete search history.

(56) References Cited

U.S. PATENT DOCUMENTS

| 7,645,110 B2 * | 1/2010 | Ogawa et al. ................. 414/547 |
| 8,113,711 B2 * | 2/2012 | Beimler et al. ............... 378/189 |
| 2006/0074406 A1 * | 4/2006 | Cooper et al. .................... 606/1 |
| 2007/0137371 A1 * | 6/2007 | Devengenzo et al. ..... 74/490.01 |
| 2010/0050806 A1 | 3/2010 | Ono et al. |
| 2012/0279341 A1 | 11/2012 | Ono et al. |

FOREIGN PATENT DOCUMENTS

| CN | 101664925 A | 3/2010 |
| JP | 01-183392 | 7/1989 |
| JP | 2007-118177 | 5/2007 |
| JP | 2008-188699 | 8/2008 |
| JP | 2009-279712 | 12/2009 |

* cited by examiner

*Primary Examiner* — Troy Chambers
*Assistant Examiner* — Jake Cook
(74) *Attorney, Agent, or Firm* — Harness, Dickey & Pierce, P.L.C.

(57) ABSTRACT

A jointed arm has an upper arm member joined to a second shoulder member, a first forearm member joined to the upper arm member by a first bending and stretching mechanism, and a wrist member joined to the first forearm member by a second bending and stretching mechanism, the first forearm member has a first turning mechanism that rotates the second bending and stretching mechanism, a hand section is joined to the wrist member by a second turning mechanism, and the rotation axes of the first and second turning mechanisms are offset. The upper arm member has a housing recessed portion that houses part of the first forearm member, part of the first turning mechanism, and part of the second bending and stretching mechanism in a state in which the first forearm member bends toward the upper arm member and the wrist member bends toward the first forearm member.

4 Claims, 4 Drawing Sheets

ROBOT

BACKGROUND

1. Technical Field

The present invention relates to a robot provided with a jointed arm having a plurality of joints.

2. Related Art

In recent years, the movement toward automating the operations that had been performed by a worker on an object to be worked on by introducing a robot provided with a jointed arm in an assembly line has become active in manufacturing industries. For example, JP-A-2007-118177 (Patent Document 1), as the above-described robot discloses a dual arm robot provided with jointed arms, each being formed of a plurality of arms joined by a joint mechanism, the jointed arms provided on both sides of a body which is supported on a base and is rotatable with respect to the base. Such a robot performs an operation in accordance with an end effector attached to the tip of the jointed arm on an object to be worked on which is placed in a working space of the robot.

Incidentally, the range of operations performed by the worker in the assembly line is often not 300 mm or more away from the worker. In addition, since such operations are often performed by the robot, the jointed arm is often folded so that the end effector of the jointed arm is located close to a robot main body. On the other hand, in the robot described in Patent Document 1, to move the end effector close to the robot main body, the joint mechanisms have to jut out toward the side of the robot main body, not being stacked in layers in front of the robot, in the jointed arm. As a result, to avoid a collision between the jointed arm and the outside every time the robot performs the above-described movement, it is necessary to increase the size of the space on the side of the robot main body, the space in which the robot is operating.

SUMMARY

An advantage of some aspects of the invention is to provide a robot that can reduce the volume occupied by a folded jointed arm.

An aspect of the invention is directed to a robot including at least one jointed arm provided with a first arm having a base end rotatably joined to a base body, a second arm having a base end joined to the tip of the first arm by a first bending and stretching mechanism in such a way that the second arm can be bent and stretched, and a third arm having a base end joined to the tip of the second arm by a second bending and stretching mechanism in such a way that the third arm can be bent and stretched, wherein the second arm has a first turning mechanism that turns the second bending and stretching mechanism with respect to the second arm, the third arm has a wrist member joined to the second bending and stretching mechanism, a hand to which an end effector is attached, and a second turning mechanism that joins the wrist member and the hand and turns the hand with respect to the wrist member by rotating the hand with respect to the wrist member, when a rotation axis in the second turning mechanism is parallel to a rotation axis in the first turning mechanism, the rotation axis in the second turning mechanism is disposed in a position offset with respect to the rotation axis in the first turning mechanism, the first arm has a housing recessed portion which is unclosed in a direction in which the second arm stretches toward the first arm in a state in which a rotation axis in the first bending and stretching mechanism and a rotation axis in the second bending and stretching mechanism are parallel to each other, and, in a state in which the second arm is bent toward the first arm and the third arm is bent toward the second arm to a side of the second arm opposite to the first arm, the housing recessed portion houses at least part of the second arm, at least part of the first turning mechanism, and at least part of the second bending and stretching mechanism.

With the robot according to the aspect of the invention, in a state in which the second arm is bent toward the first arm, at least part of the second arm, at least part of the first turning mechanism, and at least part of the second bending and stretching mechanism are housed in the housing recessed portion of the first arm. This makes it possible to make part of the volume occupied by the second arm, the first turning mechanism, and the second bending and stretching mechanism and part of the volume occupied by the first arm overlap one another. As a result, as compared to a robot having a structure in which the volume occupied by the first arm and the volume occupied by the second arm, the first turning mechanism, and the second bending and stretching mechanism are always provided separately, it is possible to reduce the volume occupied by the jointed arm when the jointed arm is folded by the overlapping volume described above. Moreover, as a result of part of the second arm etc. being housed in the housing recessed portion of the first arm, the range of rotation in which the second arm is rotated toward the first arm is expanded. In addition, since the rotation axis of the second turning mechanism is offset with respect to the rotation axis of the first turning mechanism, as compared to a structure in which no offset is provided, it is possible to increase the flexibility of the position of the end effector with respect to the second arm. Therefore, it is possible to increase the flexibility of the position that can be adopted by the jointed arm when the end effector is disposed in a target position while reducing the volume occupied by the jointed arm.

In this robot, the second bending and stretching mechanism may rotate the rotation axis of the second turning mechanism at least 150° from a state in which the rotation axis of the first turning mechanism and the rotation axis of the second turning mechanism are parallel to each other by bending the third arm toward the second arm.

With this robot, since the rotation axis of the second turning mechanism is rotated at least 150° from a state in which the rotation axis of the first turning mechanism and the rotation axis of the second turning mechanism are parallel to each other, by rotating the third arm toward the second arm by using the second bending and stretching mechanism, it is possible to make the hand face in almost the opposite direction along the rotation axis of the first turning mechanism. As a result, the flexibility of the position of the jointed arm when the hand is disposed in a particular position can be further increased.

In this robot, the first arm may have a clearance portion formed as a dogleg portion in a direction in which the second arm is bent toward the first arm, the clearance portion preventing a collision with the second arm.

Here, when the first arm is formed of, for example, a member which is linear from the base end to the tip, a collision of the second arm with the first arm may limit the angle of rotation at which the second arm is rotated toward the first arm and complicate the shape of the second arm to house the second bending and stretching mechanism in the housing recessed portion of the first arm, for example. On the other hand, in the structure described above, since a collision between the second arm and the first arm is prevented by the clearance portion, it is possible to increase the angle of rotation at which the second arm is rotated toward the first arm and prevent the shape of the second arm from becoming complicated.

In this robot, the at least one jointed arm may include a plurality of jointed arms.

In the robot provided with a plurality of jointed arms, it is also possible to perform an operation by operating only one jointed arm. In such a case, it is necessary to move the other jointed arm outside the operating range of the jointed arm which is being operated. In the structure described above, by folding the other jointed arm, the volume occupied by the jointed arm moved outside the operating range of the jointed arm which is being operated is reduced. This makes it possible to prevent a collision with the jointed arm which is being operated and increase the flexibility of a position to which the other jointed arm is moved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
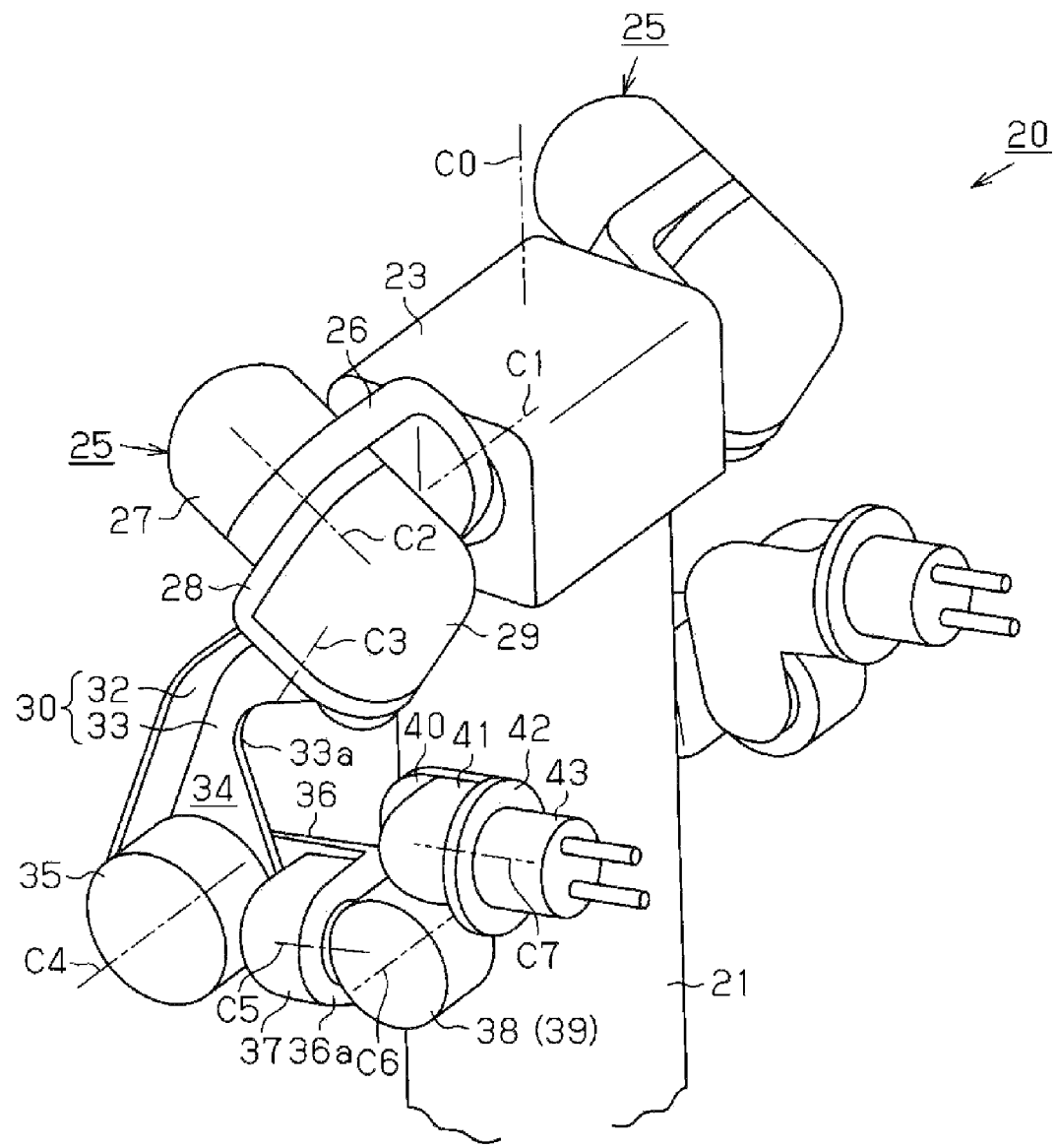
FIG. 1 is a perspective view showing an overall structure of a robot of an embodiment according to the invention.

Hereinafter, an embodiment of a robot according to the invention will be described with reference to FIGS. 1 to 5. FIG. 1 is a perspective view showing an overall structure of the robot and shows a basic position of a robot 20.

As shown in FIG. 1, the robot 20 has a cylindrical base section 21 secured to an unillustrated pedestal. To an upper end of the base section 21, a body 23 that is rotatable with respect to the base section 21 about a rotation axis C0 is joined by a joint mechanism 22 having an unillustrated servomotor etc. To both sides of the body 23, a pair of jointed arms 25 is joined by unillustrated joint mechanisms disposed inside the body 23. The pair of jointed arms 25 is rotatable with respect to the body 23 about a rotation axis C1 perpendicular to the rotation axis C0. Hereinafter, the structures of the jointed arms 25 of the robot 20 will be described. Since the jointed arms 25 joined to both sides of the body 23 have symmetrically identical structures across the body 23, the left jointed arm 25 disposed on the near side in the plane of paper in FIG. 1 will be described, and descriptions of the right jointed arm 25 disposed in the back in the plane of paper in FIG. 1 are omitted.

Figure 2:
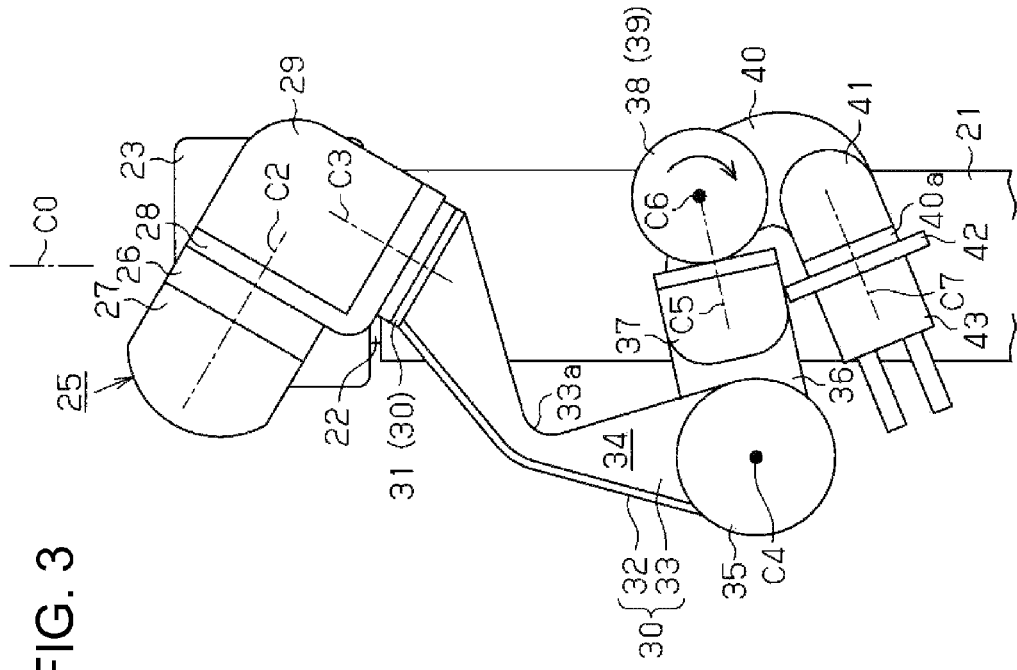
FIG. 2 is a side view showing a side structure of the robot in a basic position.

As shown in FIGS. 1 and 2, a base end of a first shoulder member 26 that is rotatable with respect to the body 23 about the rotation axis C1 is joined to the body 23 by an unillustrated joint mechanism. The joint mechanism rotates the first shoulder member 26 about the rotation axis C1 and thereby turns the joint between the body 23 and the first shoulder member 26.

To the tip of the first shoulder member 26, a second shoulder member 28 is joined by a joint mechanism 27. The second shoulder member 28 serves as a base body that is rotatable with respect to the first shoulder member 26 about a rotation axis C2 perpendicular to the rotation axis C1. The joint mechanism 27 rotates the second shoulder member 28 about the rotation axis C2 and thereby bends and stretches the joint between the first shoulder member 26 and the second shoulder member 28.

To the second shoulder member 28, an upper arm member 30 is joined by a joint mechanism 29. The upper arm member 30 serves as a first arm that is rotatable with respect to the second shoulder member 28 about a rotation axis C3 perpendicular to the rotation axis C2. The joint mechanism 29 rotates the upper arm member 30 about the rotation axis C3 and thereby turns the joint between the second shoulder member 28 and the upper arm member 30.

A base end 31 of the upper arm member 30 is joined to the joint mechanism 29, and the upper arm member 30 is formed as a long object extending from the joint mechanism 29 along the rotation axis C3. The upper arm member 30 is formed of a plate-like back plate 32 facing the back of the robot 20 and a plate-like internal plate 33 joined to the side of the back plate 32 where the base section 21 is located, the internal plate 33 facing the base section 21.

The upper arm member 30 is formed to have a virtually L-shaped cross-section which is orthogonal to the rotation axis C3. That is, a region of the upper arm member 30 in a direction in which a first forearm member 36 stretches toward the upper arm member 30, the region on the right side of the back plate 32 in FIG. 2, is unclosed, and a region of the upper arm member 30 on the near side in the plane of paper in FIG. 2, the region facing the internal plate 33, is also unclosed. In the internal plate 33, a part of an edge of the internal plate 33 in the middle in the direction of the length of the internal plate 33, the edge closer to the front of the robot 20, is shaped like a dogleg to be closer to the back of the robot 20 and forms a clearance portion 33a. In addition, in the upper arm member 30, a housing recessed portion 34 which corresponds to the volume occupied by the upper arm member 30 is formed by the back plate 32 and the internal plate 33.

To the tip of the upper arm member 30, the first forearm member 36 is joined by a first bending and stretching mechanism 35 on the side of the upper arm member 30 where the base section 21 is located. The first forearm member 36 serves as a second arm that is rotatable with respect to the upper arm member 30 about a rotation axis C4 perpendicular to the rotation axis C3. The first forearm member 36 is formed as a long object extending toward the front of the robot 20, and the base end thereof is joined to the side of the internal plate 33 of the upper arm member 30 by the first bending and stretching mechanism 35, the side of the internal plate 33 of the upper arm member 30 where the base section 21 is located. The first bending and stretching mechanism 35 rotates the first forearm member 36 about the rotation axis C4 and thereby bends and stretches the joint between the upper arm member 30 and the first forearm member 36. When the first forearm member 36 is rotated about the rotation axis C4 toward the upper arm member 30, a tip 36a thereof enters a recess formed by the clearance portion 33a, and the first forearm member 36 rotates toward a position immediately in front of a position in which the tip 36a engages the clearance portion 33a of the upper arm member 30.

To the tip 36a of the first forearm member 36, a second forearm member 38 is joined by a first turning mechanism 37. The second forearm member 38 is rotatable with respect to the first forearm member 36 about a rotation axis C5 perpendicular to the rotation axis C4. The first turning mechanism 37 is provided in such a way that the first turning mechanism 37 does not collide with the internal plate 33 of the upper arm member 30 when the first forearm member 36 is rotated toward the upper arm member 30. To the second forearm member 38, a wrist member 40 is joined by a second bending and stretching mechanism 39. The wrist member 40 is rotatable with respect to the second forearm member 38 about a rotation axis C6 perpendicular to the rotation axis C5. The second bending and stretching mechanism 39 rotates the wrist member 40 about the rotation axis C6 and thereby bends and stretches the joint between the second forearm member 38 and the wrist member 40.

To a tip 40a of the wrist member 40, a connecting member 42 is joined by a second turning mechanism 41. The connecting member 42 is rotatable with respect to the wrist member 40 about a rotation axis C7 perpendicular to the rotation axis C6. To the connecting member 42, a hand section 43 is secured, and, to the hand section 43, an end effector in accordance with an operation to be performed by the robot 20 is attached. The second turning mechanism 41 rotates the connecting member 42 about the rotation axis C7 and thereby performs a turning operation of the hand section 43 on the wrist member 40.

Figure 4:
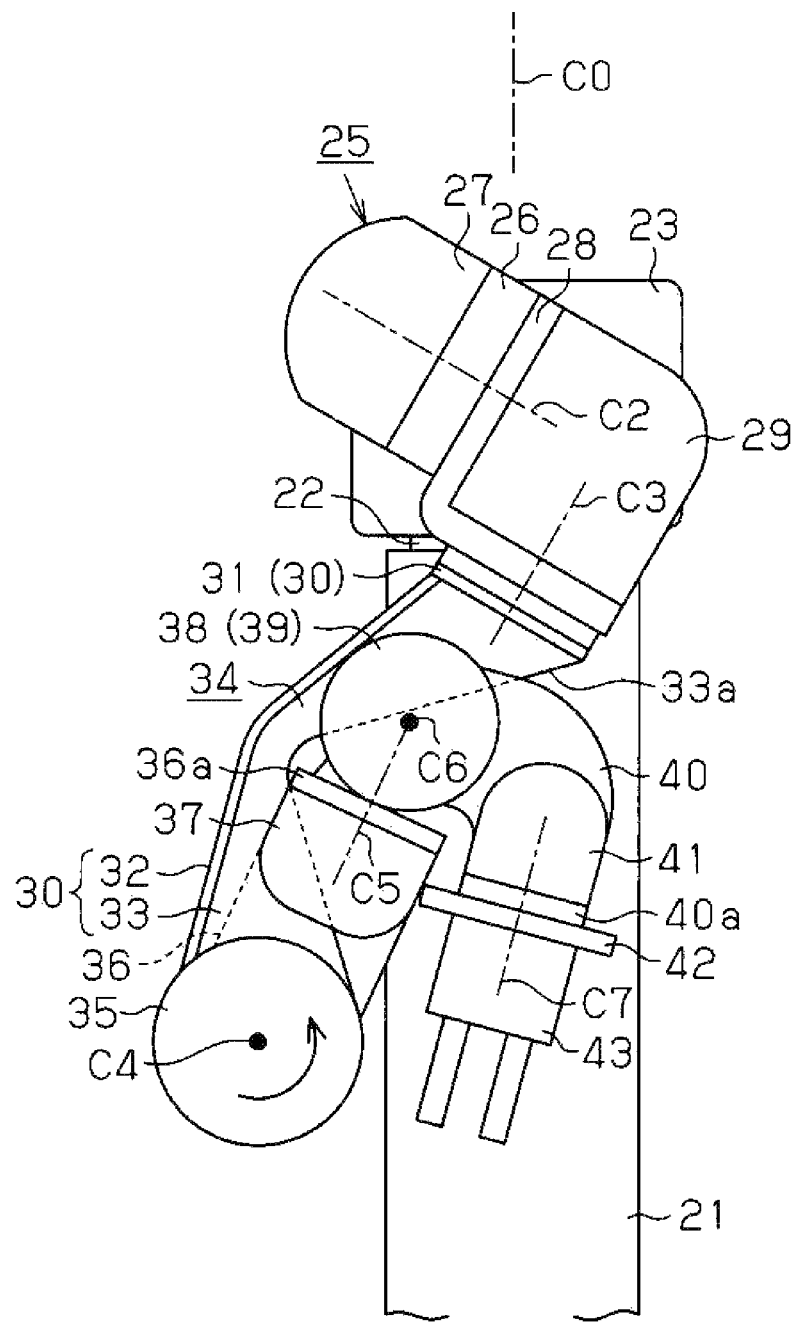
FIG. 4 is a side view showing a side structure of the folded jointed arm.

Moreover, the wrist member 40 is formed in such a way that, when the rotation axes C5 and C7 of the first and second turning mechanisms 37 and 41 that perform a turning operation become parallel to each other, the rotation axes C5 and C7 are disposed in offset positions. In this embodiment, the wrist member 40 is formed in such a way that, by rotating the wrist member 40 downward about 180° about the rotation axis C5, the second turning mechanism 41 and the hand section 43 can be disposed immediately below the first turning mechanism 37 and the second bending and stretching mechanism 39 as shown in FIG. 4.

Here, in a structure in which no offset is provided, that is, in a structure in which the rotation axis C5 in the first turning mechanism 37 and the rotation axis C7 in the second turning mechanism 41 are disposed on the same straight line in a state in which the rotation axes C5 and C7 are parallel to each other, when the rotation axis C7 is rotated about 180° with respect to the rotation axis C5 from the state in which the rotation axes C5 and C7 are parallel to each other, the hand section 43 etc. collides with the first forearm member 36 during the rotation of the rotation axis C7. That is, by providing an offset, it is possible to rotate the rotation axis C7 of the second turning mechanism 41 about 180° with respect to the rotation axis C5 of the first turning mechanism 37 from the state in which the rotation axes C5 and C7 are parallel to each other.

As a result, it is possible to increase the flexibility of the position of the hand section 43 relative to the first forearm member 36. In other words, the flexibility of the first forearm member 36 in disposing the hand section 43 in a particular position is increased, and the flexibility of the position of the jointed arm 25 is increased accordingly. Incidentally, in this embodiment, the rotation axis C7 can be rotated about 180°. However, the above-described effects can be obtained when the rotation axis C7 can be rotated at least 150°.

That is, in the robot 20, the upper arm member 30 which is the first arm is rotatably joined to the second shoulder member 28 which is the base body. Moreover, to the tip of the upper arm member 30, the second arm formed of the first forearm member 36 and the second forearm member 38 is joined in such away that the second arm can be bent and stretched. In addition, the third arm formed of the wrist member 40 and the hand section 43 is joined to the first forearm member 36 by the second bending and stretching mechanism 39 in such a way that the third arm can be bent and stretched.

Incidentally, the first bending and stretching mechanism 35 performs a bending and stretching operation of the joint between the upper arm member 30 and the first forearm member 36 by rotating the first forearm member 36 about the rotation axis C4. The first turning mechanism 37 turns the joint between the first forearm member 36 and the second forearm member 38 by rotating the second forearm member 38 about the rotation axis C5. The second bending and stretching mechanism 39 performs a bending and stretching operation of the joint between the second forearm member 38 and the wrist member 40 by rotating the wrist member 40 about the rotation axis C6. In such a structure, the distance between the rotation axis C4 and the rotation axis C6 is kept at a constant distance. In addition, the second bending and stretching mechanism 39 is provided in such a way that, when the first forearm member 36 is rotated about the rotation axis C4 toward the upper arm member 30 in the robot 20 in the basic position, the second bending and stretching mechanism 39 passes between the base end 31 of the upper arm member 30 and the first bending and stretching mechanism 35 without colliding with the internal plate 33.

Next, as the workings of a robot system structured as described above, an operation when the jointed arm 25 is folded will be described with reference to FIGS. 3 and 4.

Figure 3:
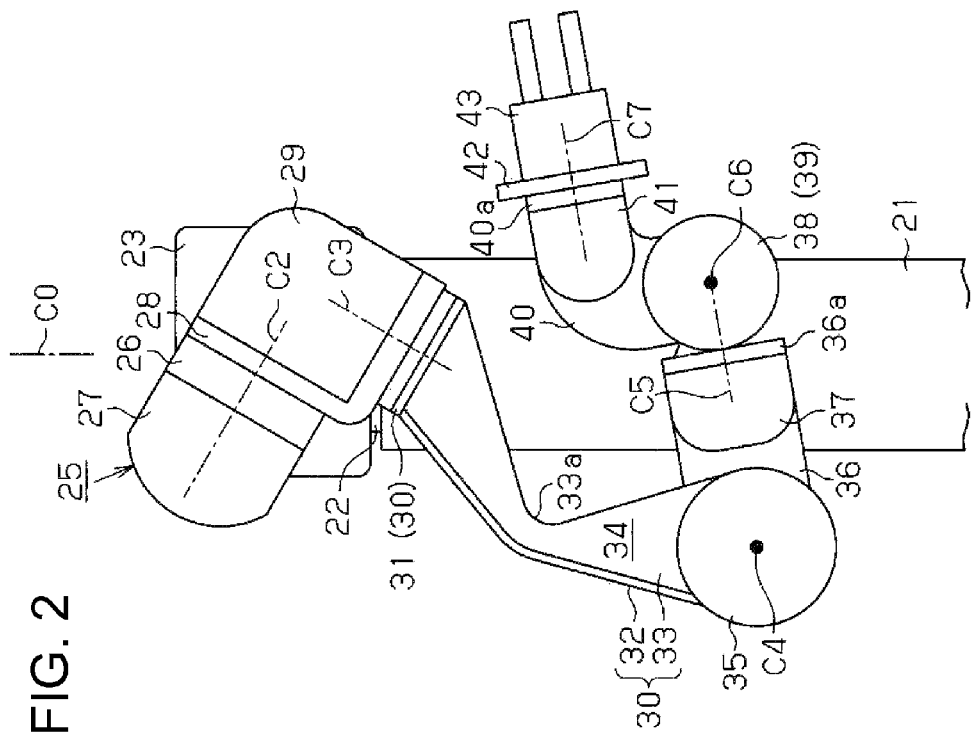
FIG. 3 is a side view showing a side structure of a jointed arm when a wrist member is folded.

When the jointed arm 25 is folded, first, in the robot 20 in the basic position, as shown in FIG. 3, the wrist member 40 rotates downward about the rotation axis C6, and the second turning mechanism 41 and the hand section 43 are disposed in a bent position immediately below the first turning mechanism 37 and the second bending and stretching mechanism 39.

Next, as shown in FIG. 4, the first forearm member 36 rotates about the rotation axis C4 toward the upper arm member 30. When the first forearm member 36 rotates, the tip 36a of the first forearm member 36 enters the clearance portion 33a, and the first turning mechanism 37 and the second bending and stretching mechanism 39 enter the housing recessed portion 34 of the upper arm member 30 accordingly. Then, when the first forearm member 36 rotates toward a position immediately in front of a position in which the tip 36a of the first forearm member 36 engages the clearance portion 33a, that is, a bent position in which an angle which the first forearm member 36 forms with the upper arm member 30 is minimized, the first turning mechanism 37 and the second bending and stretching mechanism 39 are housed in the housing recessed portion 34 of the upper arm member 30 and are disposed between the base end 31 of the upper arm member 30 and the first bending and stretching mechanism 35 provided at the tip of the upper arm member 30.

Figure 5:
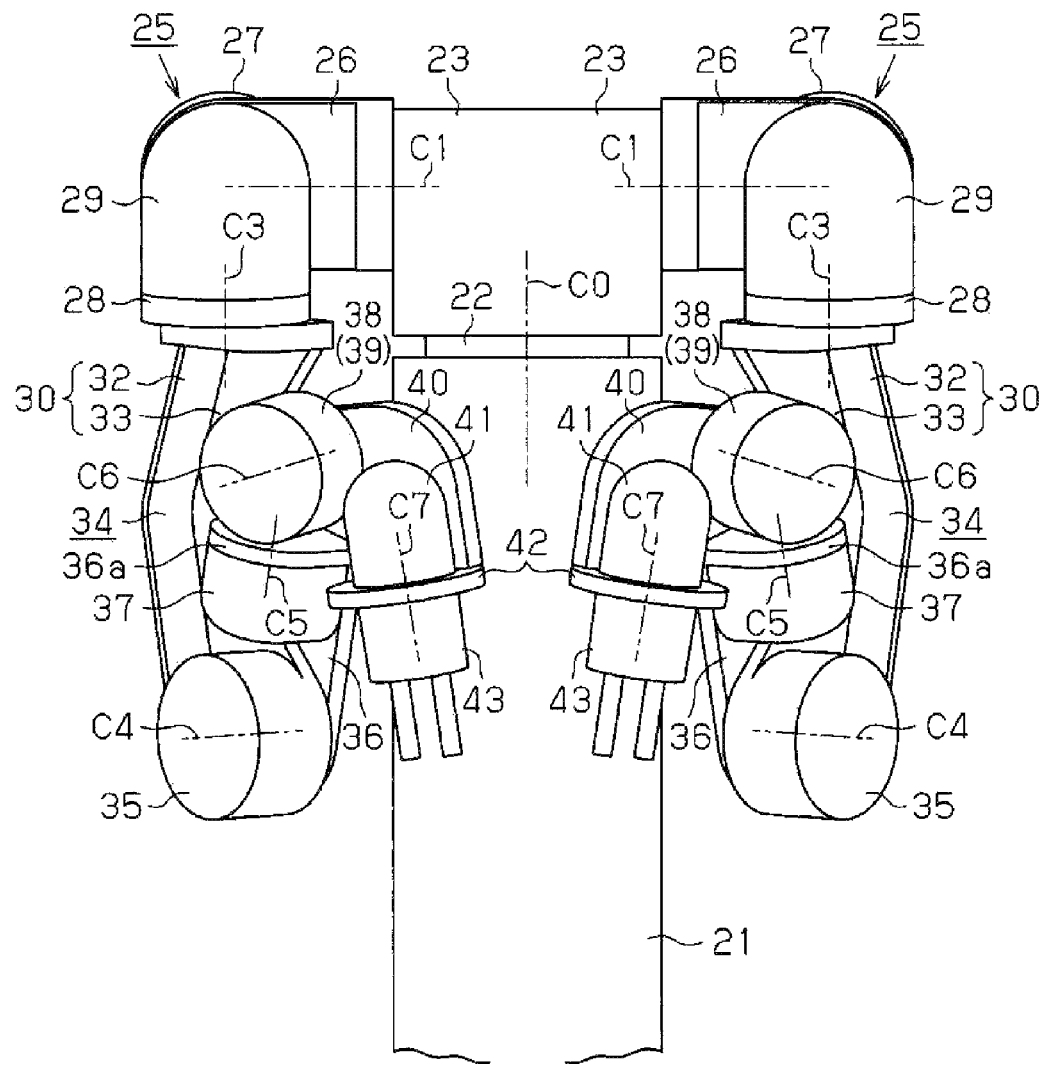
FIG. 5 is a front view of the robot and shows the downward-facing robot performing an operation on the near side in front of the robot.

Furthermore, since an offset is provided between the rotation axis C5 of the first turning mechanism 37 and the rotation axis C7 of the second turning mechanism 41, the flexibility of the jointed arm 25 in the position that the jointed arm 25 is situated in front of the front of the robot 20 with the hand section 43 bending downward is increased. Therefore, as shown in FIG. 5, when an operation is performed on the near side in front of the robot 20, the operation can be performed in a state in which the jointed arm 25 is folded, that is, a state in which the first forearm member 36 etc. is housed in the housing recessed portion 34 of the upper arm member 30.

As described above, with the robot 20 according to this embodiment, the following effects can be obtained.

(1) According to the embodiment described above, when the jointed arm 25 is folded, part of the volume occupied by the upper arm member 30 and part of the volume occupied by the first forearm member 36, the first turning mechanism 37, and the second bending and stretching mechanism 39 overlap one another. As a result, as compared to a structure in which the volume occupied by the upper arm member 30 and the volume occupied by the first forearm member 36, the first turning mechanism 37, and the second bending and stretching mechanism 39 are always provided separately, it is possible to reduce the volume occupied by the jointed arm 25 when the jointed arm 25 is folded.

(2) Furthermore, since the range of rotation of the first forearm member 36 is expanded by a portion in which part of the volume occupied by the upper arm member 30 and part of the volume occupied by the first forearm member 36, the first turning mechanism 37, and the second bending and stretching mechanism 39 overlap one another, it is possible to increase the flexibility of the trajectory which is drawn when the end effector is moved to a target position and the position of the jointed arm 25, for example, by the expanded range.

(3) Moreover, the wrist member 40 is formed in such a way that the rotation axis C7 of the second turning mechanism 41 and the rotation axis C6 of the second bending and stretching mechanism 39 are disposed in offset positions. With such a structure, the flexibility of the position of the jointed arm 25 when the end effector is disposed in a target portion can be further increased.

(4) The effects described in (1) to (3) above make it possible to increase the flexibility of the position that can be adopted by the jointed arm 25 when the end effector is disposed in a target position while reducing the volume occupied by the jointed arm 25 in the robot 20. As a result, it is possible to prevent the jointed arm 25 from jutting out greatly toward the side of the robot 20 when, for example, an operation is performed in a region near the base section 21 on the near side in front of the robot 20.

(5) In the upper arm member 30 of the embodiment described above, the clearance portion 33a is provided and the clearance portion 33a by which a collision between the tip 36a of the first forearm member 36 and the upper arm member 30 is prevented in a state in which an angle which the upper arm member 30 forms with the first forearm member 36 is minimized. With such a structure, it is possible to increase the angle of rotation of the first forearm member 36 with the first turning mechanism 37 housed in the housing recessed portion 34 of the upper arm member 30, and it is also possible to prevent the shape of the first forearm member 36 from becoming complicated to house the first turning mechanism 37 in the housing recessed portion 34.

(6) In the robot 20 of the embodiment described above, it is also possible to perform an operation by using only one of the jointed arms 25. In such a case, it is necessary to move the other jointed arm 25 outside the operating range of the one jointed arm 25.

With the structure described above, since the volume occupied by the folded jointed arm 25 is reduced, it is possible to increase the flexibility of a position to which the waiting jointed arm is moved.

Incidentally, the embodiment described above can be carried out after being appropriately modified as follows.

The robot 20 of the embodiment described above is a robot provided with jointed arms 25 on both sides of the body 23. The invention is not limited to such a robot and may be embodied as a robot provided with one jointed arm 25 structured as described above or a robot provided with three or more jointed arms 25 structured as described above.

In the internal plate 33 of the upper arm member 30 of the embodiment described above, the clearance portion 33a is provided and the clearance portion 33a by which a collision between the tip 36a of the first forearm member 36 and the upper arm member 30 is prevented in a state in which an angle which the upper arm member 30 forms with the first forearm member 36 is minimized. The invention is not limited to such a structure, and the shape of the first forearm member 36 may be changed to house the first turning mechanism 37 in the housing recessed portion 34 and the clearance portion 33a may be omitted from the internal plate 33.

In the embodiment described above, the rotation axis C5 of the first turning mechanism 37 and the rotation axis C7 of the second turning mechanism 41 are disposed in offset positions when the rotation axes C5 and C7 are parallel to each other. However, the rotation axes C5 and C7 may be disposed on the same straight line.

The jointed arm simply has to have the first arm illustrated by using the upper arm member 30 as an example, the second arm illustrated by using the first forearm member 36 and the second forearm member 38 as an example, and the third arm illustrated by using the second bending and stretching mechanism 39, the wrist member 40, and the hand section 43 as an example. That is, in the structure of the embodiment described above, for example, the second shoulder member 28 and the joint mechanism 29 may be omitted, and the upper arm member 30 may be joined to the first shoulder member 26 by the joint mechanism 27. Moreover, for example, the first shoulder member 26, the second shoulder member 28, and the joint mechanisms 27 and 29 may be omitted, and the upper arm member 30 may be joined to the body 23. Furthermore, the number of axes of the jointed arm is not limited to seven and may be five or less or eight or more.

The upper arm member 30 of the embodiment described above has formed therein the housing recessed portion 34 by being formed to have an L-shaped cross-section with the back plate 32 and the internal plate 33. However, the invention is not limited to this structure. The upper arm member 30 simply has to have a recessed portion between the base end 31 of the upper arm member 30 and the first bending and stretching mechanism 35 provided at the tip of the upper arm member 30, the recessed portion in which part of the first forearm member 36, part of the second forearm member 38, and part of the second bending and stretching mechanism 39 are to be housed, and the shape of the upper arm member 30 is not limited to a shape with an L-shaped cross-section.

The entire disclosure of Japanese Patent Application No. 2011-100814, filed Apr. 28, 2011 is expressly incorporated by reference herein.

What is claimed is:

1. A robot comprising at least one jointed arm provided with a first arm having a base end rotatably joined to a base body, a second arm having a base end joined to the tip of the first arm by a first bending and stretching mechanism in such a way that the second arm can be bent and stretched, and a third arm having a base end joined to the tip of the second arm by a second bending and stretching mechanism in such a way that the third arm can be bent and stretched, wherein the second arm has a first turning mechanism that turns the second bending and stretching mechanism with respect to the second arm, the third arm has a wrist member joined to the second bending and stretching mechanism, a hand to which an end effector is attached, and a second turning mechanism that joins the wrist member and the hand and turns the hand with respect to the wrist member by rotating the hand with respect to the wrist member, when a rotation axis in the second turning mechanism is parallel to a rotation axis in the first turning mechanism, the rotation axis in the second turning mechanism is disposed in a position offset with respect to the rotation axis in the first turning mechanism, the first arm has a housing recessed portion which is unclosed in a direction in which the second arm stretches toward the first arm in a state in which a rotation axis in the first bending and stretching mechanism and a rotation axis in the second bending and stretching mechanism are parallel to each other, and in a state in which the second arm is bent toward the first arm and the third arm is bent toward the second arm to a side of the second arm opposite to the first arm, the housing recessed portion houses at least part of the second arm, at least part of the first turning mechanism, and at least part of the second bending and stretching mechanism.

2. The robot according to claim 1, wherein the second bending and stretching mechanism rotates the rotation axis of the second turning mechanism at least 150° from a state in which the rotation axis of the first turning mechanism and the rotation axis of the second turning mechanism are parallel to each other by bending the third arm toward the second arm.

3. The robot according to claim 1, wherein the first arm has a clearance portion formed as a dogleg portion in a direction in which the second arm is bent toward the first arm, the clearance portion preventing a collision with the second arm.

4. The robot according to claim 1, wherein the at least one jointed arm includes a plurality of jointed arms.

* * * * *